United States Patent
Luo et al.

(10) Patent No.: US 9,887,647 B2
(45) Date of Patent: Feb. 6, 2018

(54) METHOD FOR CHECKING OUT-OF-STEP OF SYNCHRONOUS MOTOR

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Hui Luo, Guangdong (CN); Zhiyong Du, Guangdong (CN); Xuguang Zhou, Guangdong (CN); Xinxin Zhang, Guangdong (CN); Xing Chen, Guangdong (CN); Taotao Yang, Guangdong (CN); Lipin Cheng, Guangdong (CN)

(73) Assignees: SHENZHEN BYD AUTO R&D COMPANY LIMITED, Shenzhen, Guangdong (CN); BYD COMPANY LIMITED, Shenzhen, Guangdong (CN)

( * ) Notice: Subject to any disclaimer, the term of this patent is extended or adjusted under 35 U.S.C. 154(b) by 88 days.

(21) Appl. No.: 14/039,984

(22) Filed: Sep. 27, 2013

(65) Prior Publication Data
US 2014/0084826 A1     Mar. 27, 2014

(30) Foreign Application Priority Data

Sep. 27, 2012   (CN) .......................... 2012 1 0367290

(51) Int. Cl.
*H02H 7/08*     (2006.01)
*H02P 21/00*    (2016.01)
(Continued)

(52) U.S. Cl.
CPC ............... *H02P 6/001* (2013.01); *H02P 6/12* (2013.01); *H02P 6/34* (2016.02); *H02P 29/0241* (2016.02)

(58) Field of Classification Search
CPC .... H02P 6/14; H02P 6/001; H02P 6/12; H02P 6/22
(Continued)

(56) References Cited

U.S. PATENT DOCUMENTS 4,916,368 A * 4/1990 Onoda .................... H02P 25/03
                                                        318/723
5,625,277 A * 4/1997 Khan .................... H02J 3/1807
                                                        307/102
(Continued)

FOREIGN PATENT DOCUMENTS

CN           1404214 A        3/2003
CN         201142568 Y       10/2008
(Continued)

OTHER PUBLICATIONS

KR 10-2012-0028087 English Machine Translation Kwon et al.*
(Continued)

*Primary Examiner* — Eduardo Colon Santana
*Assistant Examiner* — Gabriel Agared
(74) *Attorney, Agent, or Firm* — Finnegan, Henderson, Farabow, Garrett & Dunner LLP

(57) ABSTRACT

A method for checking an out-of-step of a synchronous motor includes detecting three-phase currents of the synchronous motor; determining whether a relationship between the three-phase currents satisfies a preset requirement; and if no, determining that the synchronous motor is out of step. It is determined that the synchronous motor is out of step when amplitudes of each current of the three-phase currents are not equal or when the phase difference between the three-phase currents is not 120°.

17 Claims, 4 Drawing Sheets

(51) Int. Cl.
*H02P 6/00* (2016.01)
*H02P 6/12* (2006.01)
*H02P 6/34* (2016.01)
*H02P 29/024* (2016.01)

(58) Field of Classification Search
USPC ........................................ 318/400.02, 400.21
See application file for complete search history.

(56) References Cited

U.S. PATENT DOCUMENTS

| | | | | |
|---|---|---|---|---|
| 5,969,496 | A * | 10/1999 | Yamada | H02P 1/52 318/254.1 |
| 6,396,229 | B1 * | 5/2002 | Sakamoto | H02P 6/18 318/400.02 |
| 2003/0071588 | A1 | 4/2003 | Iwaji et al. | |
| 2004/0113581 | A1 * | 6/2004 | Kobayashi | G05B 19/40 318/685 |
| 2004/0249596 | A1 * | 12/2004 | Ho | H02P 6/085 702/106 |
| 2006/0125439 | A1 * | 6/2006 | Ajima | B60K 6/26 318/716 |
| 2007/0069681 | A1 | 3/2007 | Imura et al. | |
| 2009/0140688 | A1 * | 6/2009 | Iura | H02P 6/12 318/706 |
| 2011/0127937 | A1 * | 6/2011 | Takamatsu | H02P 25/024 318/400.06 |
| 2011/0156624 | A1 * | 6/2011 | Takai | H02P 6/182 318/400.04 |
| 2011/0219816 | A1 * | 9/2011 | Tanaka | H02P 6/18 62/498 |
| 2012/0001584 | A1 | 1/2012 | Takada et al. | |
| 2012/0014227 | A1 | 1/2012 | Honmura et al. | |
| 2012/0211299 | A1 | 8/2012 | Yanai | |
| 2013/0147405 | A1 * | 6/2013 | Yoon | B60L 11/14 318/400.3 |
| 2013/0249450 | A1 * | 9/2013 | Kwon et al. | 318/400.02 |

FOREIGN PATENT DOCUMENTS

| | | |
|---|---|---|
| CN | 101710692 A | 5/2010 |
| CN | 101807789 A | 8/2010 |
| CN | 102374328 A | 3/2012 |
| CN | 102687386 A | 9/2012 |
| JP | H 4-127000 A | 4/1992 |
| JP | 2003-348896 A | 12/2003 |
| JP | 2004-104935 A | 4/2004 |
| JP | 2007-336640 A | 12/2007 |
| JP | 2008-278595 A | 11/2008 |
| WO | WO 2014/048283 A1 | 4/2014 |

OTHER PUBLICATIONS

PCT International Search Report and Written Opinion dated Jan. 2, 2014, issued in International Application No. PCT/CN2013/083975 (11 pages).

Hua Yang, et al.; "The development of large vertical synchronous motor with brushless excitation for the pump station of Jiangsu Province." Public Communication of Science and Technology; May 15, 2012.

* cited by examiner

METHOD FOR CHECKING OUT-OF-STEP OF SYNCHRONOUS MOTOR

CROSS-REFERENCE TO RELATED APPLICATION

This application claims priority to, and benefits of Chinese Patent Application No. 201210367290.4, filed with the State Intellectual Property Office, P. R. China on Sep. 27, 2012, the entire contents of which are incorporated herein by reference.

FIELD

The present disclosure relates to a motor control field, and more particularly to a method for checking an out-of-step of a synchronous motor.

BACKGROUND

A permanent magnet synchronous motor (PMSM) can be controlled with a location sensor or without a location sensor. For the control method with the location sensor, a magnetic field location of the synchronous motor is detected by the location sensor, whereas for a control method without the location sensor, a rotor location is estimated by a location estimation module. The out-of-step of the synchronous motor is defined with respect to a synchronization, i.e., a rotating magnetic field of the stator and the magnetic field of a rotor magnet do not rotate synchronously. In the PMSM system, the out-of-step occurs due to reasons such as high system load and reduced motor performance. When the motor is out of step, the rotating speed of the motor is generally uncontrollable, which will cause serious losses and safety risks. Thus, there is a need to check the out-of-step of the synchronous motor precisely and timely.

SUMMARY

Embodiments of the present disclosure seek to solve at least one of the problems existing in the prior art.

One objective of the present disclosure is to provide a method for checking an out-of-step of a synchronous motor which can determine whether the synchronous motor is out of step precisely.

According to some embodiments of the present disclosure, a method for checking an out-of-step of a synchronous motor is provided. The method comprises steps of: detecting three-phase currents of the synchronous motor; determining whether a relationship between the three-phase currents satisfies a preset requirement; and if no, determining that the synchronous motor is out of step.

In one embodiment of the present disclosure, determining whether the relationship between the three-phase currents satisfies a preset requirement comprises: determining whether amplitudes of the three-phase currents are equal; if yes, determining whether periods of the three-phase currents are of a same sine wave; if yes, determining whether a phase difference between the three-phase currents is 120°; if yes, determining that the relationship between the three-phase currents satisfies the preset requirement; and if no, determining that the relationship between the three-phase currents does not satisfy the preset requirement.

In one embodiment of the present disclosure, if amplitudes of the three-phase currents are not equal, it is determined that the synchronous motor is out of step.

The method for checking an out-of-step of a synchronous motor according to embodiments of the present disclosure calculates the relationship between the three-phase currents in real time according to the detected three-phase currents. According to the fact that the three-phase currents of the synchronous motor in a normal running forward state should have an equal amplitude and a 120° phase difference, it can be determined that the synchronous motor is out of step when amplitudes of the three-phase currents are not equal or when the phase difference between the three-phase currents is not 120°, and then protective processes such as turning off waves can be performed to prevent a further damage, thus reducing losses and enhancing a safety.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
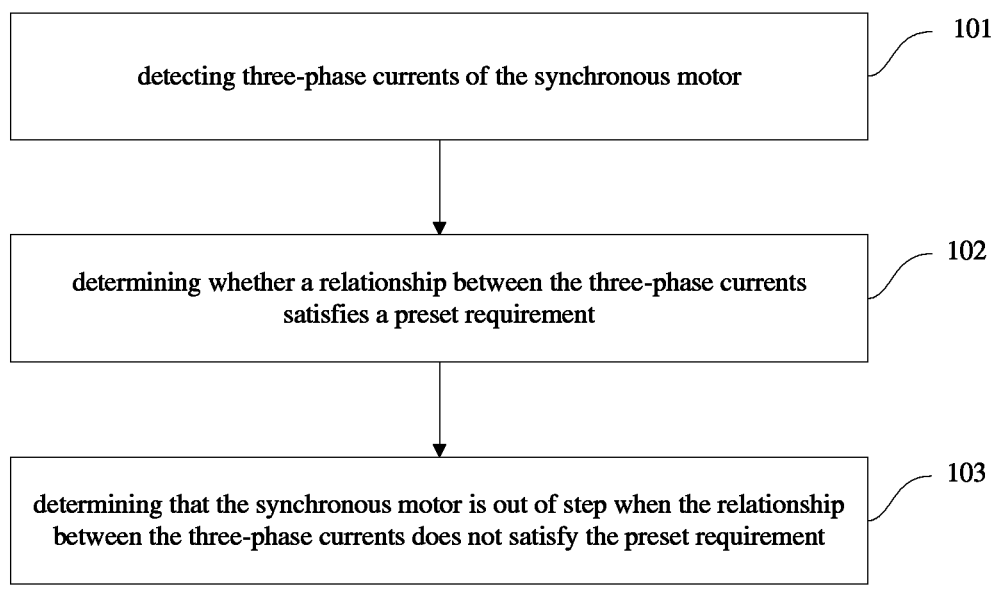
FIG. 1 is a flow chart of a method for checking an out-of-step of a synchronous motor according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

It is to be understood that phraseology and terminology used herein with reference to device or element orientation (such as, terms like "longitudinal", "lateral", "up", "down", "front", "rear", "left", "right", "vertical", "horizontal", "top", "bottom", "inside", "outside") are only used to simplify description of the present invention, and do not indicate or imply that the device or element referred to must have or operated in a particular orientation. They cannot be seen as limits to the present disclosure. Moreover, terms of "first"

and "second" are only used for description and cannot be seen as indicating or implying relative importance.

Unless otherwise stipulated and restricted, it is to be explained that terms of "installation", "linkage" and "connection" shall be understood broadly, for example, it could be permanent connection, removable connection or integral connection; it could be direct linkage, indirect linkage or inside linkage within two elements. Those of ordinary skilled in the art shall understand the concrete notations of the terms mentioned above according to specific circumstances.

In the following, the method for checking an out-of-step of a synchronous motor will be described in detail with reference to drawings.

FIG. 1 is a flow chart of a method for checking an out-of-step of a synchronous motor according to an embodiment of the present disclosure. As shown in FIG. 1, the method comprises the following steps.

At step 101, three-phase currents of the synchronous motor are detected.

In one embodiment of the present disclosure, the three-phase currents of the synchronous motor are detected by a Hall sensor. Specifically, leads of any two phases of the three phases are connected to the Hall sensor. When a current passes through the leads, the Hall sensor will sense a voltage signal proportional to the current, and then the voltage signal is sampled by a digital signal processor (DSP). The DSP calculates the current according to the voltage signal and a transform proportion. After the currents of any of the above two phases are obtained, the current of the third phase can be obtained according to a formula $I_A+I_B+I_C=0$, where $I_A$, $I_B$ and $I_C$ represent the three-phase currents respectively.

At step 102, it is determined whether a relationship between the three-phase currents satisfies a preset requirement.

In one embodiment of the present disclosure, it is firstly determined whether amplitudes of three currents (three-phase currents) are equal. When the amplitudes of the three currents are equal, it is further determined whether periods of the three currents are of a same sine wave. Then, when the periods of the three currents are of a same sine wave, it is further determined whether a phase difference between the three phases is 120°.

At step 103, it is determined that the synchronous motor is out of step when the relationship between the three-phase currents satisfies the preset requirement. In one embodiment, when the phase difference between the three phases is 120°, it is determined that the relationship between the three-phase currents satisfies the preset requirement.

The method for checking an out-of-step of a synchronous motor according to embodiments of the present disclosure calculates the relationship between the three-phase currents in real time according to the detected three-phase currents. According to the fact that the three-phase currents of the synchronous motor in a normal running forward state should have an equal amplitude and a 120° phase difference, it can be determined that the synchronous motor is out of step when amplitudes of the three currents are not equal or when the phase difference between the three phases is not 120°, and then protective processes such as turning off waves can be performed to prevent a further damage, thus reducing losses and enhancing safety.

The out-of-step of the synchronous motor may be classified into a plurality of types. For example, some types may indicate that there is no rotating magnetic field (i.e., neither the stator field nor the rotor rotates), some types may indicate that the synchronous motor rotates reversely (i.e., the rotor of the synchronous motor rotates reversely) and some types may indicate that the rotor is locked (i.e., the rotor is locked while the stator field rotates). In light of this, the method according to the present disclosure can also determine the type of the out-of-step of the synchronous motor when the relationship of the three-phase currents does not satisfy the preset requirement. Thus, it is convenient to find out the reasons that result in the out-of-step, such that a corresponding process can be performed to avoid a recurrence of a similar out-of-step, thus enhancing the safety and reducing losses.

Further, in one embodiment of the present disclosure, the type of the out-of-step of the synchronous motor comprises a first type of out-of-step and a second type of out-of-step. In the following description, the first type of out-of-step indicates that there is no rotating magnetic field, i.e., neither the stator field nor the rotor rotates, and the second type of out-of-step indicates that the rotor of the synchronous motor is locked, i.e., the rotor is locked while the stator field rotates.

More specifically, when it is determined that each current of the three-phase currents is a direct current, it can be determined that the type of the out-of-step of the synchronous motor is the first type of out-of-step. This is because, when there is no magnetic field (i.e., neither the stator field nor the rotor rotates), an induced electromotive force is calculated to be abnormal according to the current rotor location and load. At this time, a velocity increment is calculated to be zero by an algorithm which estimates the velocity and calculates the angle when there is no rotor location, and an angle increment is also zero. When the electric degree used for controlling does not change, the three-phase currents appear to be the direct current. Therefore, when it is determined that each current of the three-phase currents is a direct current, it can be determined that the out-of-step is caused by the fact that neither the stator field nor the rotor rotates.

Figure 2:
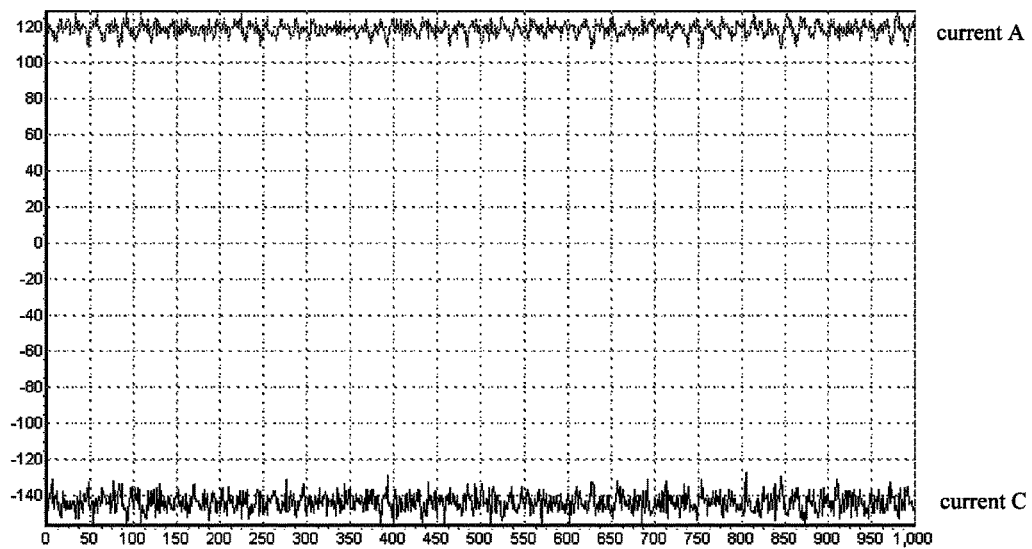
FIG. 2 is a schematic view showing a waveform of three-phase currents when a first type of out-of-step of the synchronous motor occurs according to an embodiment of the present disclosure.

FIG. 2 is a schematic view showing a waveform of three-phase currents when a first type of out-of-step of the synchronous motor occurs according to an embodiment of the present disclosure. As shown in FIG. 2, when the first type of out-of-step occurs, each current of the three-phase currents is the direct current. For the sake of clarity, only waveforms of two currents A and C of the three-phase currents are shown in FIG. 2.

When not all the currents of the three-phase currents are the direct currents, a maximum value of each current of the three-phase currents is calculated to obtain three maximum values, and then it is determined whether a ratio between a maximum value of the three maximum values and a minimum value of the three maximum values is larger than or equal to a preset threshold, and if yes, it is determined that the type of the out-of-step of the synchronous motor is the second type of out-of-step. Specifically, absolute values of the three-phase currents in one period are obtained to calculate the maximum value of each current of the three-phase currents. Advantageously, for each current of the three-phase currents, calculation may be performed for many times (such as 5 times) to obtain a plurality of real-time maximum current values, and then a middle value of the plurality of real-time maximum current values is selected to be the maximum value. Thus, the current detection accuracy is enhanced and a mistake is avoided. In order to further enhance the accuracy, the above steps may be repeated for many times, and when the ratio calculated each time is greater than or equal to the preset threshold, it can be determined that the three-phase currents are out of balance, and the synchronous motor is out of step.

Specifically, when the motor is locked, the rotor keeps still, the magnetic field of the rotor magnet keeps unchanged, and the magnetic field intensity at the magnetic pole is the largest. If there is still an induced electromotive force on the Q axis at the moment when the motor stops rotating, the velocity increment and the angle increment of the stator can still be calculated according to the algorithm which estimates the velocity and calculates the angle when there is no rotor location. Thus, the angle still changes as normal, and the angle change makes the composite magnetic field rotate, and the induced electromotive force is generated when the rotating magnetic field cuts the stator winding. According to the formula U=R*I+L*dI/dt+N*BLV, when the voltage U is given, the value of the current I is determined by the magnetic field intensity B. Therefore, when the three-phase stator windings are in different magnetic fields, each current of the three-phase currents is different from each other, which causes an out-of-balance of the three-phase currents. Thus, when the ratio between the maximum value of the three maximum values and a minimum value of the three maximum values is larger than or equal to the preset threshold, it can be determined that the three-phase currents are out of balance, and the second type of out-of-step of the synchronous motor occurs. In one embodiment, the preset threshold may be about 1.3.

Figure 3:
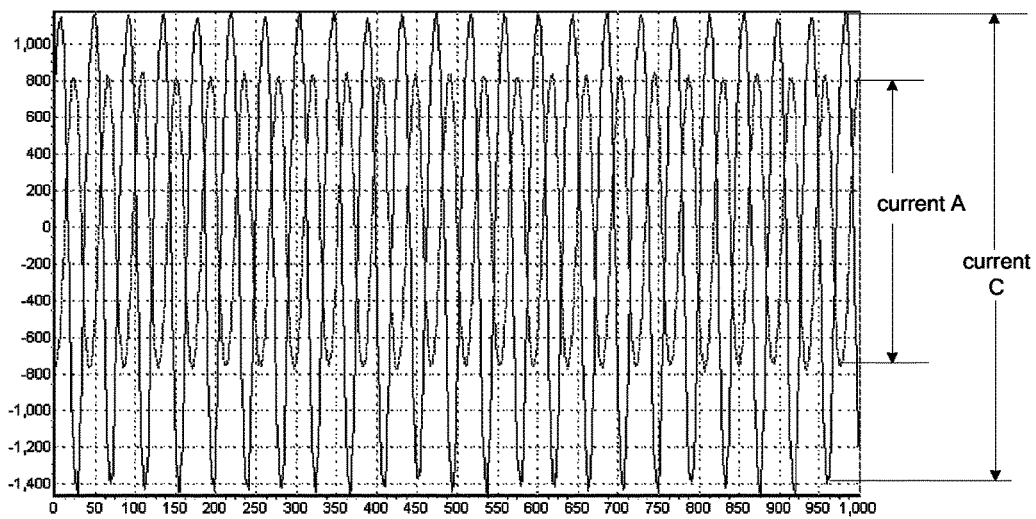
FIG. 3 is a schematic view showing a waveform of three-phase currents when a second type of out-of-step of the synchronous motor occurs according to an embodiment of the present disclosure.

FIG. 3 is a schematic view showing a waveform of three-phase currents when a second type of out-of-step of the synchronous motor occurs according to an embodiment of the present disclosure. Only the waveforms of current A and current C are shown in FIG. 3. The waveforms of current A and current C are sine waves. It can be seen from FIG. 3 that the amplitudes of the three-phase currents are different while the phases of the three-phase currents still change as normal when the second type of out-of-step occurs.

Figure 4:
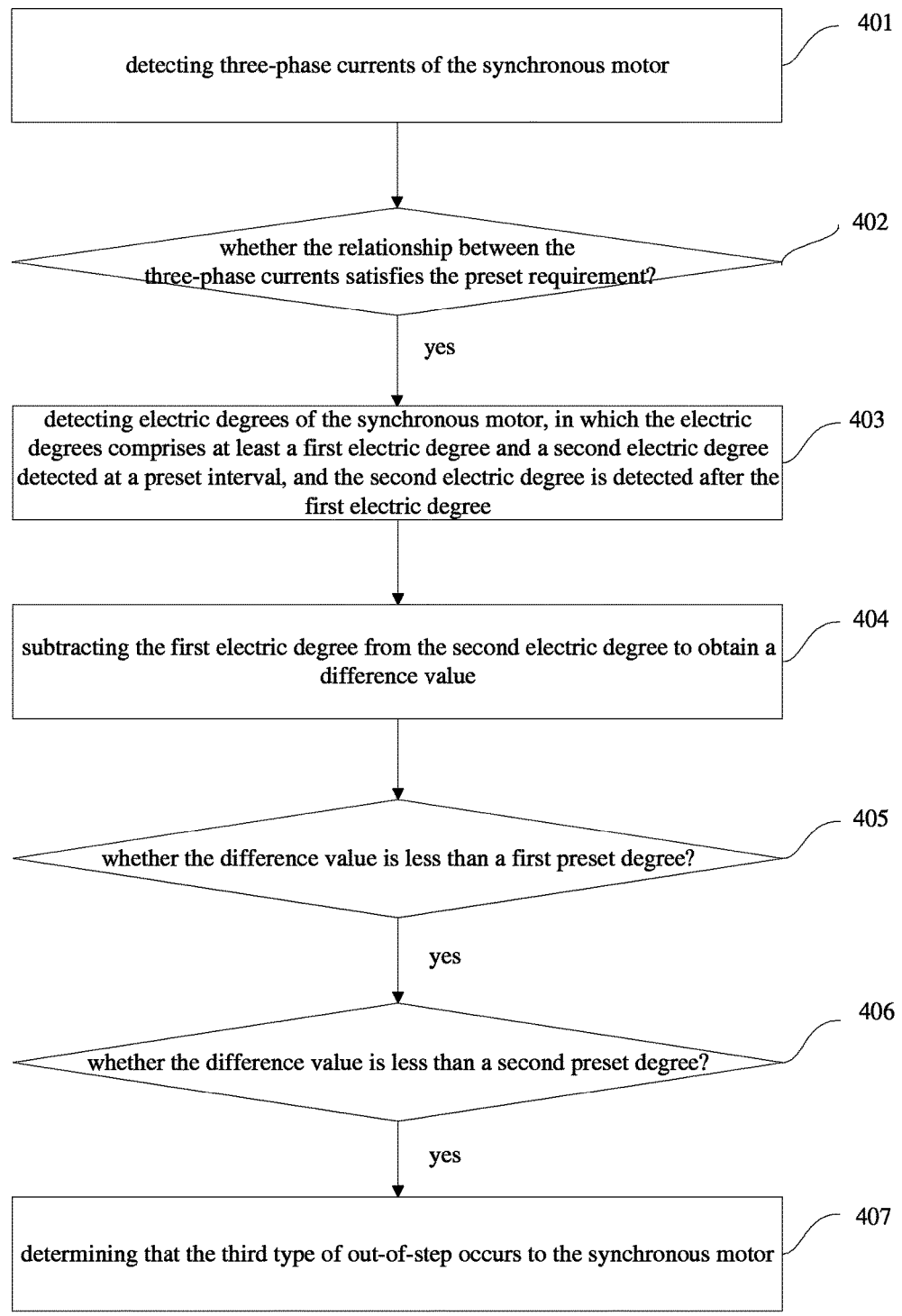
FIG. 4 is a flow chart of a method for checking an out-of-step of a synchronous motor according to another embodiment of the present disclosure.

In another embodiment of the present disclosure, the type of out-of-step of the synchronous motor may also comprise a third type of out-of-step. Hereinafter, the third type of out-of-step indicates that the motor rotates reversely, i.e., the rotor of the synchronous motor rotates reversely. FIG. 4 is a flow chart of a method for checking an out-of-step of a synchronous motor according to another embodiment of the present disclosure. As shown in FIG. 4, the method comprises the following steps.

At step 401, the three-phase currents of the synchronous motor are detected.

At step 402, it is determined whether the relationship between the three-phase currents satisfies the preset requirement.

At step 403, the electric degree of the synchronous motor is detected when the relationship between the three-phase currents satisfies the preset requirement. At least a first electric degree and a second electric degree are detected at a preset interval, and the second electric degree is detected after the first electric degree. In one embodiment, the preset interval may be but not limited to one program control period in the control algorithm which controls when there is no rotor location, i.e., one program period. In other words, the first electric degree is the electric degree in a certain period, and the second electric degree is the electric degree in the next period. The electric degree is detected when the synchronous motor is in a closed loop control state. For example, it is firstly determined whether the synchronous motor is in the closed loop control state, and if yes, the electric degree for controlling the synchronous motor is detected. Specifically, the step of detecting the electric degree of the synchronous motor comprises the following steps.

Firstly, a first current and a first voltage on an α axis and a second voltage and a second current on a β axis in an α-β coordinate system are obtained. Specifically, in the control algorithm which controls when there is no rotor location, the first voltage $V_\alpha$ and the first current $I_\alpha$ on the α axis and the second voltage $V_\beta$ and the second current $I_\beta$ on the β axis can be obtained by PI regulation of the current inner loop and the coordinate transformation.

Secondly, an induced electromotive force is obtained according to the first voltage $V_\alpha$, the first current $I_\alpha$, the second voltage $V_\beta$ and the second current $I_\beta$. For example, the induced electromotive forces $E_\alpha$ and $E_\beta$ are calculated according to the following formula.

$$\begin{cases} V_\alpha = I_\alpha R + L\frac{dI_\alpha}{dt} + E_\alpha \\ V_\beta = I_\beta R + L\frac{dI_\beta}{dt} + E_\beta \end{cases}$$

Thirdly, an instantaneous angular velocity of the synchronous motor is obtained according to the induced electromotive force and an induced electromotive force constant of the synchronous motor. Specifically, the induced electromotive forces $E_\alpha$ and $E_\beta$ are firstly converted into Ed and Eq, in which Ed is the induced electromotive force on d axis, and Eq is the induced electromotive force on q axis, and then the induced electromotive force Eq is corrected and then divided by the induced electromotive force constant to obtain the instantaneous angular velocity of the synchronous motor. The correction to the induced electromotive force Eq comprises: when the induced electromotive force Eq is greater than zero, the induced electromotive force Ed is subtracted from the inducted electromotive force Eq; and when the induced electromotive force Eq is less than zero, the induced electromotive force Ed is added to the inducted electromotive force Eq. In one embodiment, the induced voltage of the stator winding of the synchronous motor rotating under a rated speed is used as the induced electromotive force constant.

Finally, the instantaneous angular velocity is integrated to obtain the electric degree. In other words, after the instantaneous angular velocity is time integrated, the electric degree is obtained.

Both the first electric degree and the second electric degree can be calculated according to the above method.

At step 404, the first electric degree is subtracted from the second electric degree to obtain a difference value.

At step 405, it is determined whether the difference value is less than a first preset degree. In other words, it is determined whether an electric degree increment in each program period is less than the first preset degree. In the normal condition, the electric degree increment in each program period should be greater than a theoretic minimum variation (i.e., the first preset degree). In one embodiment, the first preset degree can be obtained from the formula θ=PωT, where θ is the first preset degree, P is a number of electrode pairs of the synchronous motor, ω is a mechanical angular velocity, and T is the preset interval.

At step 406, it is further determined whether the difference value is less than a second preset degree when the difference value is less than the first preset degree. In one embodiment, the second preset degree is zero.

At step 407, it is determined that the third type of out-of-step occurs to the synchronous motor when the difference value is less than the second preset angle. As the second preset angle is zero, it can be considered that when the electric degree variation in the program period is a negative value, the third type of out-of-step occurs. Specifically, when the rotor of the synchronous motor rotates reversely due to load impact or other reasons, the calculated induced electromotive force becomes a negative value, the stepping value of the electric degree estimated in the program becomes a negative value, which means that the electric degree decreases progressively. Thus, when the electric degree increment in each program period is a negative value, it can be determined that the rotor rotates reversely, and the synchronous motor is out of step.

Figure 5:
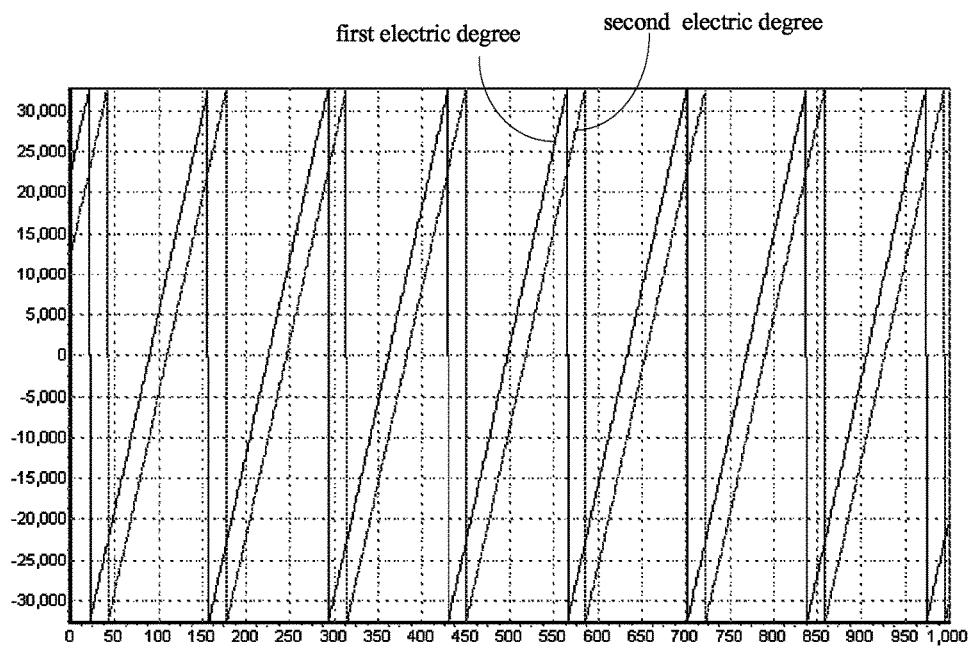
FIG. 5 is a schematic view showing waveforms of a first electric degree and a second electric degree when the synchronous motor rotates normally according to an embodiment of the present disclosure.

FIG. 5 is a schematic view showing waveforms of a first electric degree and a second electric degree when the synchronous motor rotates normally according to an embodiment of the present disclosure. As shown in FIG. 5, the electric degree increases progressively.

Figure 6:
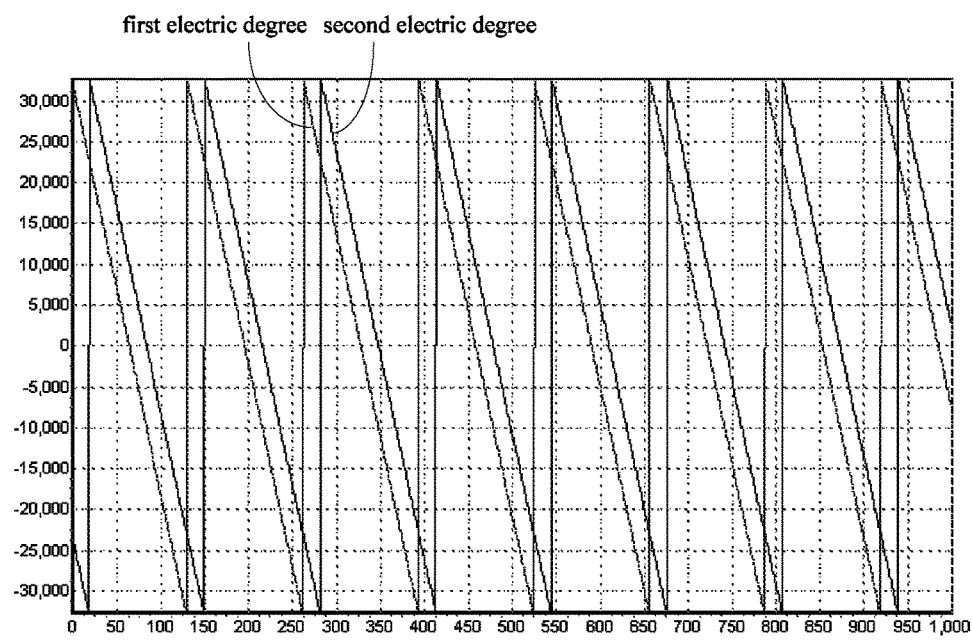
FIG. 6 is a schematic view showing waveforms of a first electric degree and a second electric degree when a third type of out-of-step occurs to the synchronous motor according to an embodiment of the present disclosure.

FIG. 6 is a schematic view showing waveforms of a first electric degree and a second electric degree when a third type of out-of-step of the synchronous motor occurs according to an embodiment of the present disclosure. As shown in FIG. 6, when the third type of out-of-step occurs, the electric degree decreases progressively.

Further, when the synchronous motor is out of step (no matter which type of out-of-step), the wave such as a PWM wave may be turned off to protect the synchronous motor. For example, six PWM waves of the power bridge circuit are controlled to be turned off. Thus, it is possible to avoid an occurrence of accident, prevent the accident from deteriorating and enhance reliability of the synchronous motor.

Those skilled in the art shall appreciate that the embodiments of the invention can be embodied as a method, a system, or a computer program product encoded into a computer readable storage medium. The computer program product can be executed by a processor to perform the method as described in the disclosure.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented method for controlling a synchronous motor, the method comprising:
   transmitting one or more control signals to the synchronous motor;
   detecting, with a sensor, three-phase currents of the synchronous motor;
   determining whether the three-phase currents satisfy a preset requirement, wherein the preset requirement comprises amplitudes and periods of the three-phase currents being equal, the three-phase currents being sinusoidal, and the three-phase currents being separated by a phase difference of 120 degrees;
   responsive to the determination that the three-phase currents do not satisfy the preset requirement, determining that the synchronous motor is out of step;
   determining a type of the out-of-step of the synchronous motor based on the three-phase currents, wherein the type of the out-of-step of the synchronous motor comprises a first type of out-of-step indicating that there is no rotating magnetic field and a second type of out-of-step indicating that a rotor of the synchronous motor is locked; and
   disabling a pulse width modulation (PWM) signal to the synchronous motor when the synchronous motor is determined to be out of step.

2. The method according to claim 1, further comprising: responsive to the determination that the amplitudes of the three-phase currents are not equal, determining that the synchronous motor is out of step.

3. The method according to claim 1, wherein determining a type of the out-of-step of the synchronous motor based on the three-phase currents comprises:
   determining whether each of the three-phase currents is a direct current;
   responsive to the determination that each of the three-phase currents is a direct current, determining that the type of the out-of-step of the synchronous motor is the first type of out-of-step;
   responsive to the determination that at least one of the three-phase currents is not a direct current, determining a maximum value of each of the three-phase currents to obtain three maximum values;
   determining a ratio between a maximum value of the three maximum values and a minimum value of the three maximum values;
   responsive to the determination that the ratio is larger than or equal to a preset threshold, determining that the type of the out-of-step of the synchronous motor is the second type of out-of-step.

4. The method according to claim 1, wherein the type of the out-of-step further comprises a third type of out-of-step.

5. The method according to claim 4, further comprising:
   responsive to the determination that the three-phase currents satisfy the preset requirement:
   determining electric degrees of the synchronous motor, wherein the electric degrees comprise at least a first electric degree and a second electric degree, the second electric degree being detected after the first electric degree;
   determining a difference value between the first electric degree and the second electric degree;
   determining whether the difference value is less than a preset degree;
   responsive to the determination that the difference value is less than the preset degree, determining that the third type of out-of-step occurs to the synchronous motor.

6. The method according to claim 5, wherein the first electric degree is detected in a first program period, and the second electric degree is detected in a subsequent program period.

7. The method according to claim 4, wherein the third type of out-of-step indicates that the rotor of the synchronous motor rotates reversely.

8. The method according to claim 5, further comprising:
determining whether the synchronous motor is in a closed loop control state; and
responsive to the determination that synchronous motor is in a closed loop control state, detecting the electric degrees of the synchronous motor.

9. The method according to claim 5, wherein determining the electric degrees of the synchronous motor comprises:
determining a first voltage and a first current on an $\alpha$ axis and a second voltage and a second current on a $\beta$ axis in an $\alpha$-$\beta$ coordinate system;
determining an induced electromotive force based on the first voltage, the first current, the second voltage and the second current;
determining an instantaneous angular velocity of the synchronous motor based on the induced electromotive force and an induced electromotive force constant of the synchronous motor; and
determining the electric degrees based on an integration of the instantaneous angular velocity.

10. The method according to claim 5, wherein the preset degree is zero.

11. The method according to claim 1, wherein the three-phase currents of the synchronous motor are obtained by a Hall sensor.

12. A non-transitory computer readable storage medium comprising computer program codes that are executable by a hardware processor to cause the hardware processor to perform a method for controlling a synchronous motor, the method comprising:
transmitting one or more control signals to the synchronous motor;
receiving, from a sensor, sensor data representing three-phase currents of the synchronous motor;
determining, based on the sensor data, whether the three-phase currents satisfy a preset requirement, wherein the preset requirement comprises amplitudes and periods of the three-phase currents being equal, the three-phase currents being sinusoidal, and the three-phase currents being separated by a phase difference of 120 degrees;
responsive to the determination that the three-phase currents do not satisfy the preset requirement, determining that the synchronous motor is out of step;
determining a type of the out-of-step of the synchronous motor based on the three-phase currents, wherein the type of the out-of-step of the synchronous motor comprises a first type of out-of-step indicating that there is no rotating magnetic field and a second type of out-of-step indicating that a rotor of the synchronous motor is locked; and
disabling a pulse width modulation (PWM) signal to the synchronous motor when the synchronous motor is determined to be out of step.

13. The non-transitory computer readable storage medium of claim 12, further comprising computer codes executable by the hardware processor to cause the hardware processor to further perform:
determining whether each of the three-phase currents is a direct current; and
responsive to the determination that each of the three-phase currents is a direct current, determining that the out-of-step of the synchronous motor is the first type of out-of-step.

14. The non-transitory computer readable storage medium of claim 12, further comprising computer codes executable by the hardware processor to cause the hardware processor to further perform:
calculating a maximum value of each of the three-phase currents to obtain three maximum values;
determining a ratio between a maximum value of the three maximum values and a minimum value of the three maximum values;
responsive to the determination that the ratio is larger than or equal to a preset threshold, determining that the out-of-step of the synchronous motor is the second type of out-of-step.

15. The non-transitory computer readable storage medium of claim 12, further comprising computer codes executable by the hardware processor to cause the hardware processor to further perform:
responsive to the determination that the three-phase currents satisfy the preset requirement:
determining electric degrees of the synchronous motor, wherein the electric degrees comprise at least a first electric degree and a second electric degree, the second electric degree being detected after the first electric degree;
determining whether a difference value between the first electric degree and the second electric degree is less than a preset degree;
responsive to the determination that the difference value is less than the preset degree, determining that the out-of-step of the synchronous motor is a third type of out-of-step.

16. A system for controlling a synchronous motor, comprising:
a memory that stores a set of instructions; and
a hardware processor configured to execute the set of instructions to perform:
transmitting one or more control signals to the synchronous motor;
receiving, from a sensor, sensor data representing three-phase currents of the synchronous motor;
determining, based on the sensor data, whether the three-phase currents satisfy a preset requirement, wherein the preset requirement comprises amplitudes and periods of the three-phase currents being equal, the three-phase currents being sinusoidal, and the three-phase currents being separated by a phase difference of 120 degrees;
responsive to the determination that the three-phase currents do not satisfy the preset requirement, determining that the synchronous motor is out of step;
determining a type of the out-of-step of the synchronous motor based on the three-phase currents, wherein the type of the out-of-step of the synchronous motor comprises a first type of out-of-step indicating that there is no rotating magnetic field and a second type of out-of-step indicating that a rotor of the synchronous motor is locked; and
disabling a pulse width modulation (PWM) signal to the synchronous motor when the synchronous motor is determined to be out of step.

17. The method of claim 1, wherein the PWM signal is transmitted to the synchronous motor via a power bridge circuit.

* * * * *